March 15, 1966  A. W. MUSGRAVE  3,240,286
GEOPHYSICAL PROSPECTING

Filed March 13, 1962  6 Sheets-Sheet 1

March 15, 1966  A. W. MUSGRAVE  3,240,286
GEOPHYSICAL PROSPECTING

Filed March 13, 1962  6 Sheets-Sheet 2

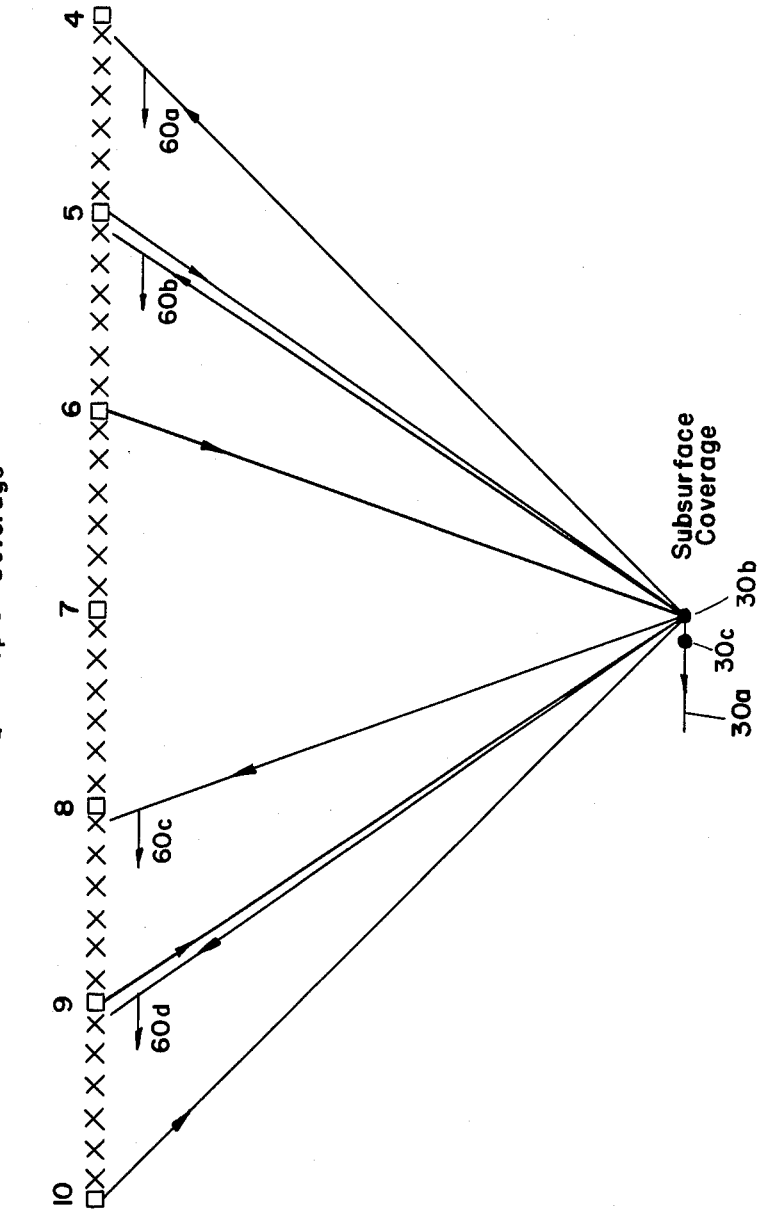

United States Patent Office 3,240,286
Patented Mar. 15, 1966

3,240,286
GEOPHYSICAL PROSPECTING
Albert W. Musgrave, Dallas, Tex., assignor to Socony Mobil Oil Company, Inc., a corporation of New York
Filed Mar. 13, 1962, Ser. No. 179,378
8 Claims. (Cl. 181—.5)

This invention relates to seismic surveying procedures and has for an object the provision of a method of obtaining at minimum cost seismic data which will yield reliable information of the location and geometry of subsurface formations.

Heretofore, seismic data has been obtained by use of the well-known seismic techniques utilizing small charges of dynamite in shotholes with geophones located at some distance therefrom to receive signals reflected from subsurface formations. In order to decrease the cost of field operations in some areas and with enhancement of the seismic records, the explosive-charge method has to some degree been superseded by the thumping method wherein a weight is dropped successively at various points in a prearranged pattern. The pattern for thumping in a resulting composite record then forms the source of seismic energy which yields the information used by geophysicists in determination of sursurface formations. In order to drop the weight at the plurality of points in the preselected pattern, a thumping truck is utilized which moves successively from one location to another. At each location the weight is dropped and a seismic record made of the signals detected by the geophones or detectors forming the spread. The geophones themselves are ordinarily utilized in arrays of 50 or more, each array corresponding with the single geophones forming the spread utilized with explosive charges. The foregoing points up the fact that many manipulations are necessary in the field in respect to the equipment. Thus, the thumping truck must be moved from one thumping point to another in each source location and from one source location to another. For reasons earlier set forth, considerable manpower must be utilized in moving the geophones from one location to another. The recording truck itself must also be moved from location to location as the geophone pattern is moved along the line of exploration.

In the case of obtaining multiple coverage by conventional thumping techniques, considerable time may be spent by the recording crew waiting for the thumping crew to get in position. The conventional technique involves the laying out of a spread of geophones and the operations by a thumping crew at a first source point spaced from one end of the spread. After completion of the thumping operation at the first point, the thumping crew now moves to a second source point spaced from an opposite end of the spread a distance about equal to that of the first point from said one end of the spread. During the movement of the thumping crew, the recording crew and the geophone or cable crew are idle. The amount of idle time is a function of the available route between the source points, a route that can be quite indirect due to the presence of man-made and natural obstacles.

In accordance with the present invention, there may be obtained an accumulation of seismic data in less time than heretofore and with the substantial absence of any waiting periods on the part of the crew during the thumping and recording and the movement of equipment from location to location. As hereinafter explained, two thumping trucks are utilized. With each of them at different source locations, as soon as one truck has dropped its weight, the truck proceeds to its next drop-point. As soon as the seismic signals are recorded, the second truck drops its weight and the signals are recorded. Meanwhile, the first truck arrives at its now location. By the alternate dropping of the weights from different source locations, the signals are to a large degree continuously arriving at the recording truck. Full-time use is made of the recording equipment and its personnel. While the foregoing achieves savings in that the data is obtained much more expeditiously, in addition waiting periods required for the geophone placement crew to move the spread of geophones from one location to another may be minimized.

Further in accordance with the invention, a selected number of geophones used to form a particular spread while located at one formation may in conjunction with an additional set of geophones adjoining said selected number form a new spread. Thus, instead of moving the geophone spread as a whole, the geophone placement crew will be constantly moving selected sets of geophones from one portion of the spread to another to form new spreads. These come into being by electrically connecting the newly placed geophones to the selected number after completion of the records to be made by the spread previously established. In this manner, there is avoided delay times in moving the geophone spreads as a whole. Further refinements of the field techniques will be later described.

While the foregoing has aided considerably in decreasing field costs, the present invention also includes procedures by means of which there is attained quadruple coverage of the subsurface segments. That is to say, for each subsurface segment covered by a particular portion of the spread, there will be three portions of three additional spreads covering the same section. By then compositing the four records, after correction for weathering, elevation and normal moveout, there will be obtained signals with decreased noise and spurious signals and with enhancement of reflections. This result comes about by reason of the fact that the travel paths of the seismic energy for each of the common portions of the records of a given segment have different lengths. By having the travel paths of different lengths, seismic noise energy tends to cancel out in the compositing process while vertical energy is benefited and, in fact, may be added cumulatively to produce more distinctive records. Seismic noise energy is defined to include near surface waves with essentially horizontal travel paths, multiple reflections, ghosting and defracted first waves associated with complex geological structures.

Inasmuch as there are utilized at least two source trucks for the dropping of the weights and since the signals will be arriving at the recording truck first from one direction and then from a different direction (in terms of travel of the seismic energy), provisions are made in the recording trucks to identify the location of the source and the location of the spread so that the signals from corresponding segments may later be composited. In one form of the invention, two recording media are utilized: one for the seismic signals from one location and the other for the seismic signals from the second location, this being one way to keep the data separated. Since the program as a whole for the field procedure is correlated with that desired in the data to be analyzed, by utilizing the present invention the data may be used for application of the expanded spread techniques as explained in my copending application Serial No. 95,111, filed March 13, 1961, and entitled "Expanding-Spread Seismic Exploration." Thus, the great utility of the present invention is demonstrated by the flexibility in the variety of uses which may be made of the data obtained in a single field operation.

By reason of the quadruple coverage of a particular segment by seismic energy which has traveled thereto and has been reflected therefrom over travel paths of differing lengths, it is feasible in many instances greatly to reduce the thumping pattern as by reduction in the number of weight drops needed for each source location. Where the number of weight drops has not been reduced over the number previously utilized, there have been achieved in some locations better records than heretofore. Thus, the invention provides advantages in a lesser number of drops for correspondingly distinctive data and, in some cases, improved data over that previously obtained.

For a more detailed explanation of the invention and for further objects and advantages thereof, reference is to be had to the following description taken in conjunction with the accompanying drawings in which.

Figure 3:
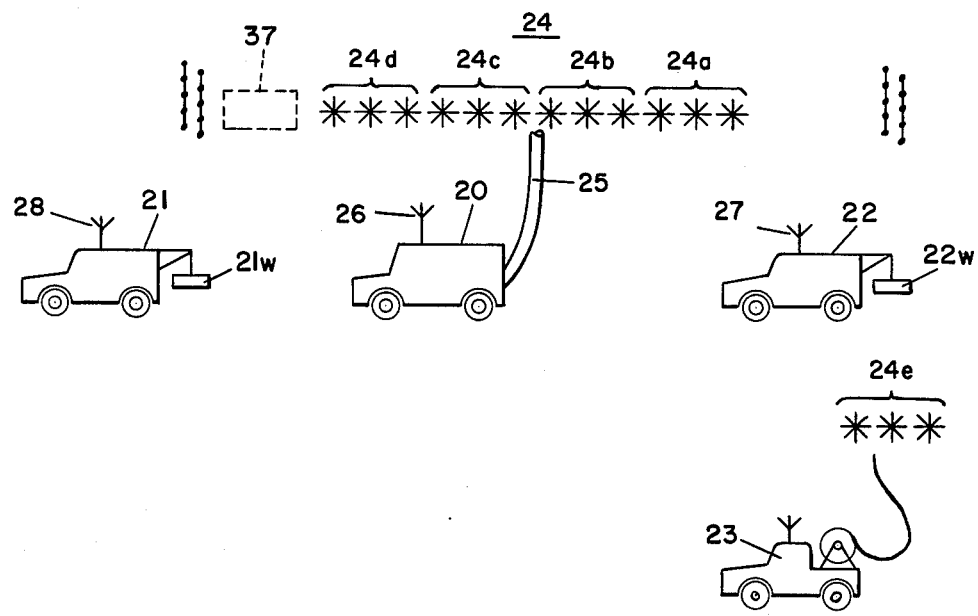
Figure 4:
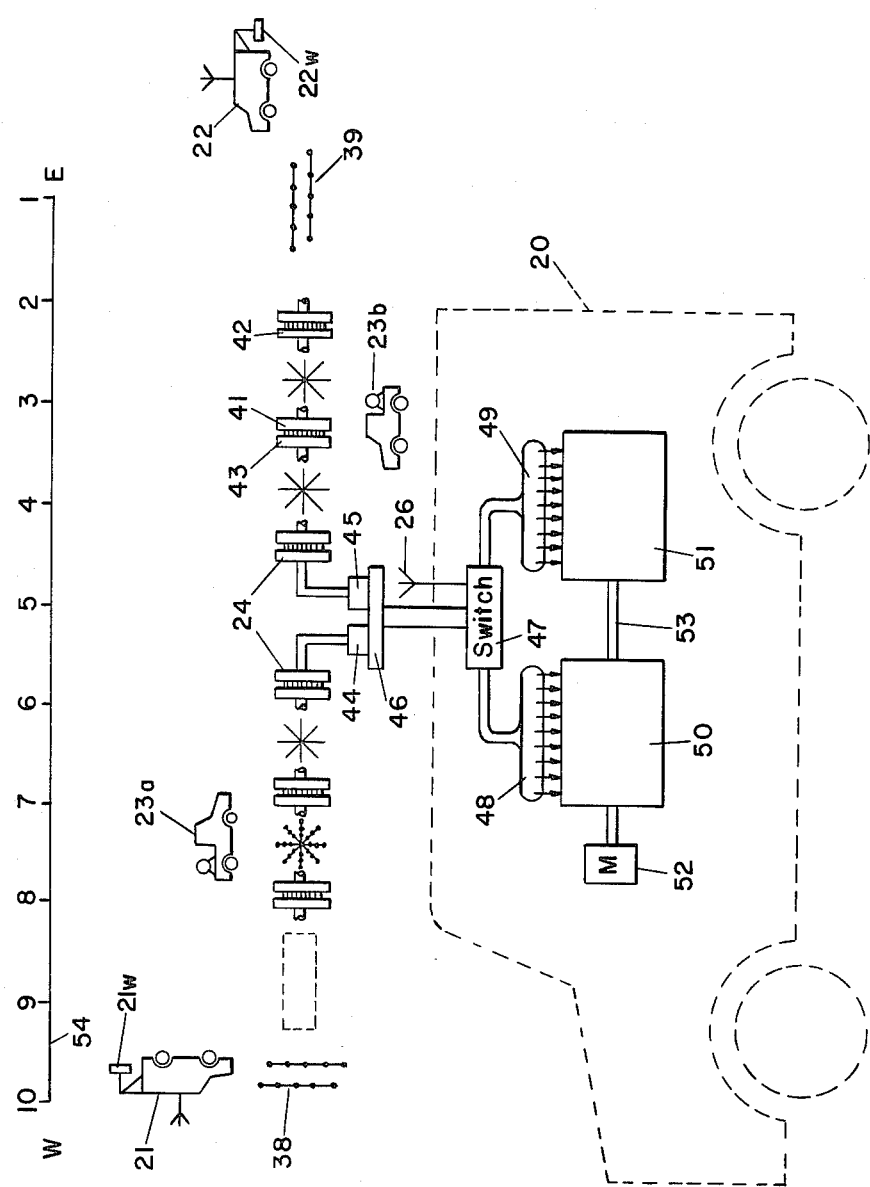
Figure 5:
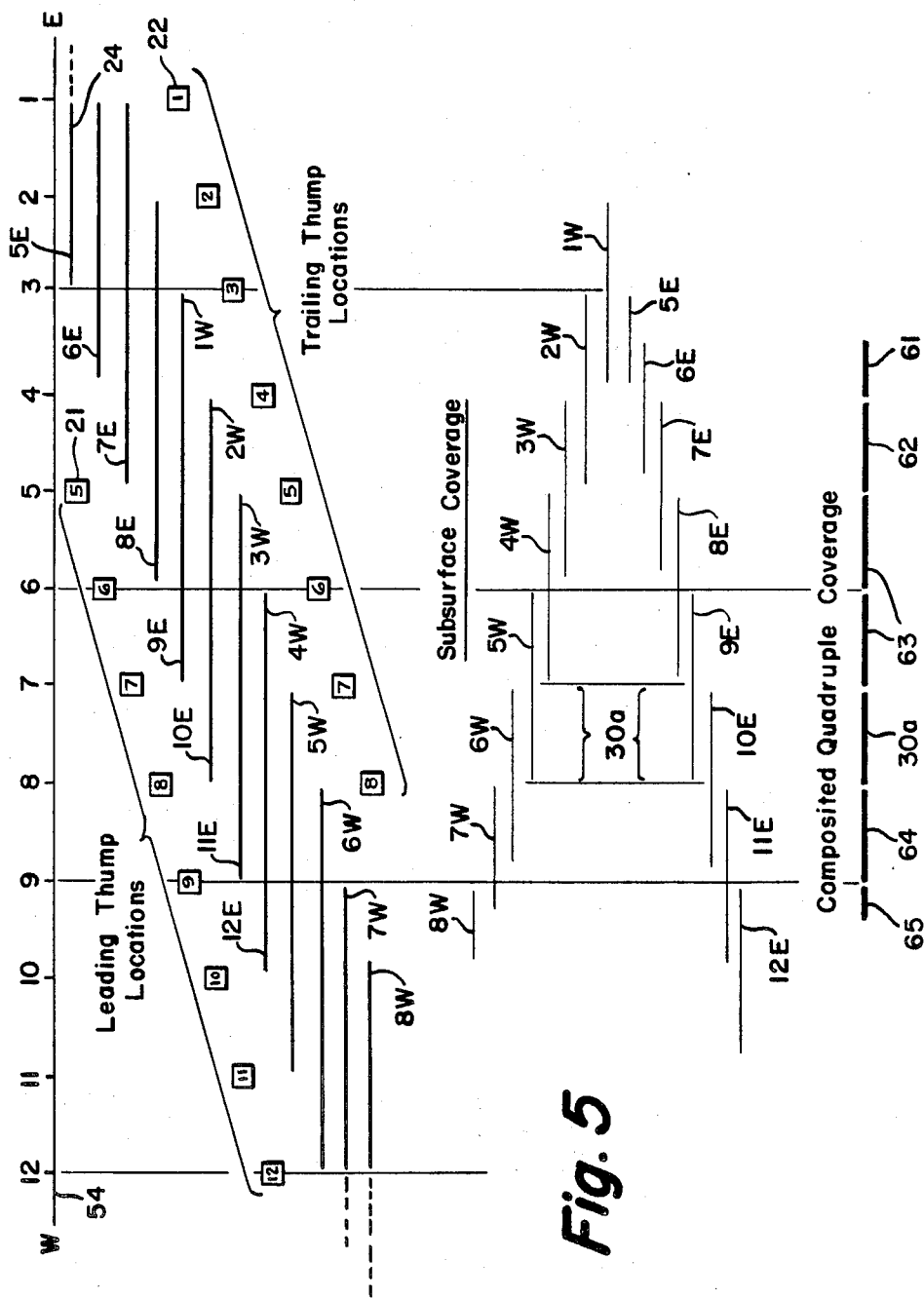
Figure 6:
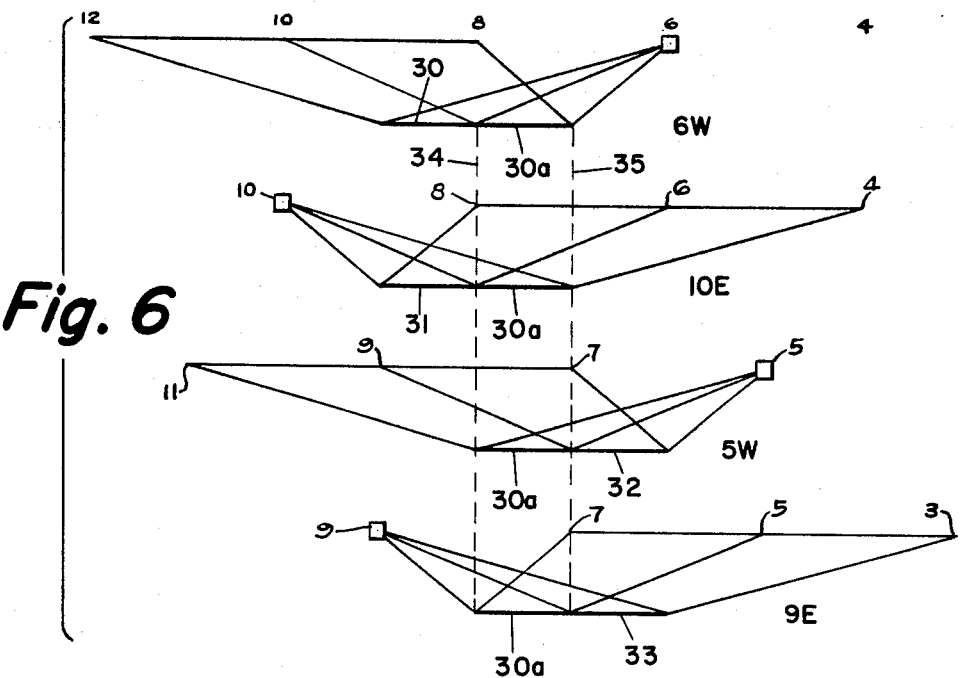
Figure 7:
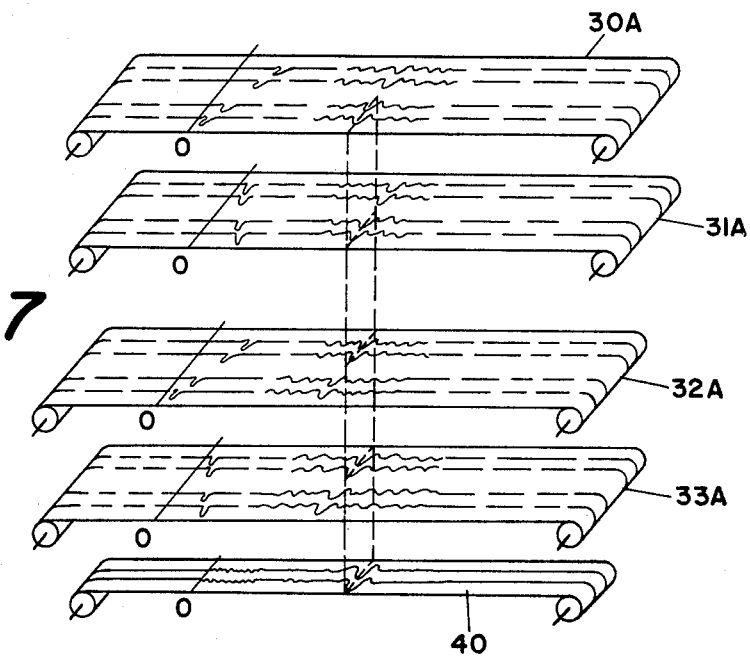

FIG. 3 diagrammatically illustrates field procedures in accordance with the present invention together with symbols of thumping patterns which may be utilized;

FIG. 4 diagrammatically illustrates further features of the system of FIG. 3;

FIG. 5 is similar to FIGS. 3 and 4 but illustrates in more detail the arrangements of the apparatus and the character of records obtained with the field procedure to be followed in accordance with the present invention;

FIG. 6 illustrates ray paths from different sources and different spread locations to illustrate how the quadruple coverage is obtained for a particular selected segment;

FIG. 7 illustrates one selected method of compositing records obtained from the procedures illustrated in FIG. 5 to form an expanding spread; and FIG. 8 is a ray diagram also illustrative of the manner of obtaining the records of FIG. 7.

Figure 1:
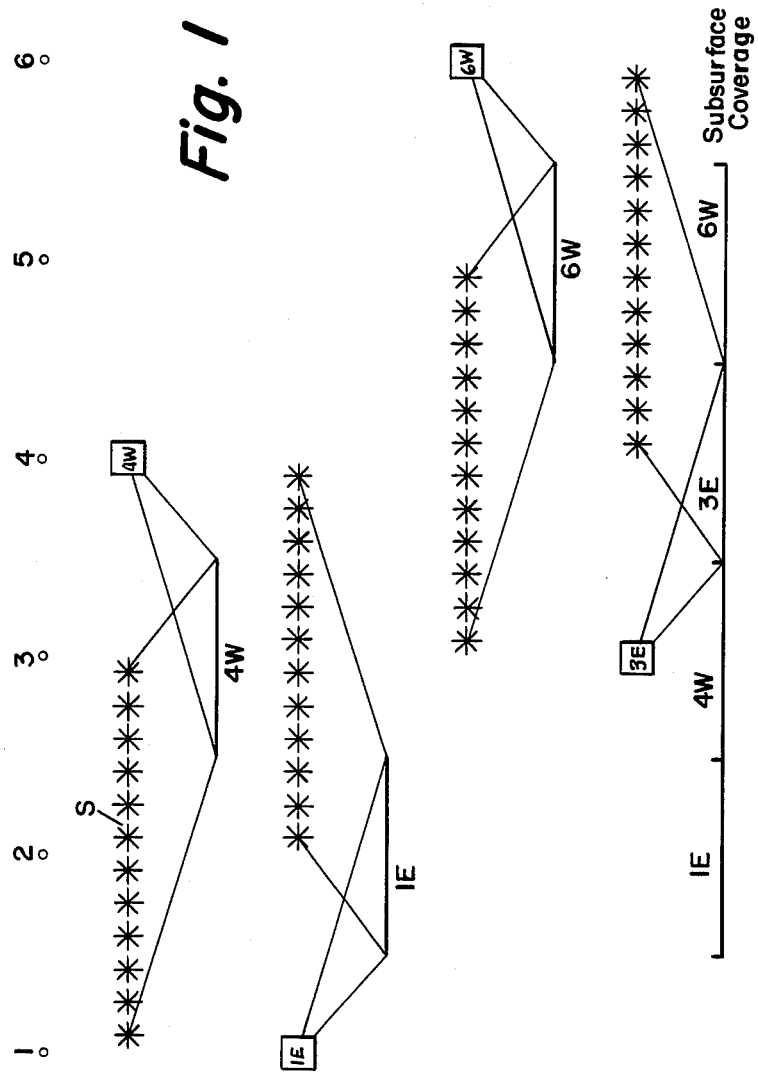
FIG. 1 illustrates previously utilized techniques and which is herein presented to make easier an understanding of the present invention.

In seismic surveys known as the skip-continuous type, the source of seismic energy at a location 4, FIG. 1, is utilized for a spread S which may be located between locations 1 and 3. With such an illustrated arrangement, seismic energy from the source at location 4 will delineate a subsurface section 4W. The source is then moved to location 1 while the spread is moved between locations 2 and 4. Seismic energy is again generated. This second operation will delineate the section labeled 1E. The foregoing is repeated as illustrated with the source at location 6 to produce the section 6W and then at location 3 to produce the section 3E. A consideration of the several locations and the different positions of the geophone spread will suggest at once the problem arising in the field to accomplish the skip-continuous survey. Thus, the thumper truck must move from location 4 to location 1, while the recording truck located in the region of the geophones will be at standstill, and so will its crew. The thumper truck must then move from the second to the third location; again with lost time on the part of the crew. The geophone spread is moved with each changing setup of the thumper truck, the movement being illustrated as a progressive one from location 1 to location 6.

Figure 2:
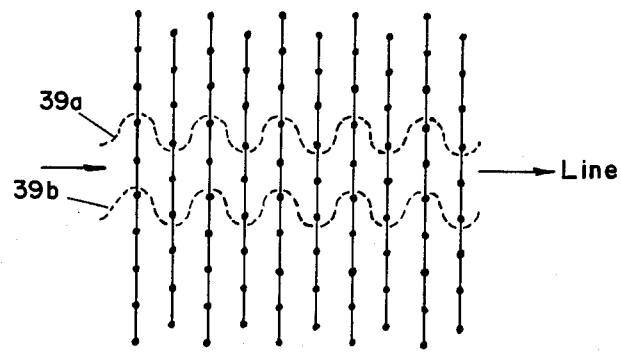
FIG. 2 illustrates a typical thumping pattern of a type which may be utilized in connection with FIG. 1 or in connection with the remaining figures.

Utilizing the dropping-weight or thump technique, there will be at each of the source locations an established pattern for the truck to follow. Thus, as illustrated in FIG. 2, the weight may first be dropped at the first point or heavy dot in the upper left-hand column; and the truck will then proceed to each of the locations indicated by the additional heavy dots in the vertical line, then moving to the second column and upwardly thereof, dropping the weight at each of the designated locations. Thus, the truck follows a serpentine route transverse of the vertical lines. When the truck has dropped its weight a hundred times, the pattern will have been completed and the hundred records obtained at the location of the spread will be composited to produce a single record corresponding with a detonation of dynamite at the source location.

Though it is to be understood that the present method may be practiced in different ways, it will be helpful to describe first an example which has been utilized in the field and found to be satisfactory. In the partial illustration of the invention as appearing in FIG. 3, a recording truck 20 has been illustrated in a location approximately midway of a geophone spread 24. This spread, as above described, may be of any desired length. As shown, the spread 24 includes 12 detector stations, each formed by a multiplicity of geophones, a term herein used generically to refer to seismic wave detectors, connected in selected series-parallel arrangement so that the plurality of geophones at each detector station, when connected to their own detector circuit as provided in the associated cable, will offer the same impedance as other detector stations. There may be 50, 60 or 100 geophones forming each detector station, and these may be distributed in wave-receiving relationship with the earth in patterns of a kind suggested by the star-like representations of FIG. 3. Normally, the conductors separately interconnecting the several stations will be completed midway of the spread by cable connectors to a cable 25 leading to the recording truck 20.

In accordance with the present invention, two weight-dropping or thumper trucks 21 and 22 follow a predetermined program for the dropping of the weights. For example, the truck 21 may at a location along one of the vertical parallel bars drop its weight 21w. The resultant seismic waves are then received by the detector stations of the spread 24 and transmitted to the recording truck 20 where the signals from the multiplicity of detector stations are recorded on a suitable recording medium. As soon as the seismic signals resulting from the dropping of the weight 21w by the truck 21 have been received, an operator at the recording truck 20 transmits a signal from a transmitting antenna 26 to a receiving antenna 27 of truck 22. It thereupon drops its weight 22w at the first of a plurality of impact stations located along the vertical parallel lines spaced from the right or to the east of spread 24. After the seismic signals from the dropping of the weight 22w at truck 22 have been received, a signal is transmitted from the recording truck antenna 26 to a receiving antenna 28 carried by truck 21 at which time its weight is dropped at the second impact station. Thus, the weights 21w and 22w at the locations of the weight-dropping patterns are alternately dropped to generate seismic waves, first on one side and then on the other side of the spread 24 and at suitable spacings therefrom.

While the foregoing operations are taking place, a cable truck 23 will be distributing the multiplicity of geophones of a section of the cable 24e and comprising three detector stations at a location 37 extending along the line of exploration coinciding with the central positions of the detector stations of the spread 24. When the geophones of the section 24e have been properly placed in contact with the earth and in the appropriate configurations, the geophone or cable truck 23 will then be dispatched to the right-hand end of the spread 24. By the time it arrives, the thumping patterns will have been completed by the trucks 21 and 22. Thus, personnel accompanying the truck 23 may then remove section 24a from the spread 24 and return it to a position to the left of the location of cable section 24e. Thus, as the truck 23 is moving to the right-hand of the spread 24, the recording truck can be moving to the left to a new position midway of the spread which will now include section 24e but which will not include section 24a. Similarly, the weight-dropping trucks 21 and 22 will be proceeding to the left to new weight-dropping locations where new thumping patterns will be followed, each including a plurality of impact stations.

Referring now to FIG. 4, there have been illustrated two cable trucks 23a and 23b. The thumper truck 21 has been shown as following a vertical pattern 38 of impact stations, while the thumper truck 22 is following a horizontal pattern 39 of impact stations. The different patterns will seldom both be used during exploration, it being understood that either of the patterns 38 or 39 can be utilized at each end of the cable. They are shown differently in FIG. 4, better to illustrate these two alternate ways of practicing the invention.

One manner of thumping the pattern 39 is illustrated in FIG. 2 where undulating dashed lines 39a and 39b define the path taken by a thumping truck as it drops its weight at each of the heavy dots intersected by lines 39a and 39b.

Only four detector stations have been illustrated for the spread 24 of FIG. 4, each of the detector stations including its plurality of geophones being shown as terminating in coupling members, only selected ones of which have been identified by reference characters 41 and 42, it being understood that each coupling member is arranged to plug the circuits of its detector station to the cable extending along the spread. For example, the coupling member 41 is illustrated as plugged into a cooperating coupling member 43.

The geophones to the right and to the left of the central part of the spread 24 have multiple-point connectors 44 and 45 plugged into a master connector 46 which extends to a switch 47 by means of which the circuits may be transferred to the recording head 48 or 49 respectively associated with recording drums 50 and 51. These drums 50 and 51 carried by the recording truck 20 are driven at the same speed by any suitable means, such as a motor 52. They can, as shown, be conveniently mounted on the same drive shaft 53. As earlier explained, the signals received by the dropping of a weight by the truck 21 may be recorded by the recording heads 48 on the recording drum 50. Thus, the recording medium may be magnetic tape, though any suitable medium may be used which lends itself to playback of the signals after a recording period. As soon as the signals have been received, there is transmitted by the transmitter 26 an appropriate signal to the truck 22 to drop its weight, and concurrently the switch 47 is operated to switch the circuits to the recording heads 49 for recording the signals on magnetic tape carried by the recording drum 51. These signals from the first source location formed by the impact stations in the configuration of 38 are recorded on drum 50, while all signals developed by the dropping of the weight at the impact stations in the configuration of 39 are recorded on the magnetic tape carried by the drum 51. In this way, there may be conveniently distinguished in the field the seismic signals coming from east or west of the location of the recording truck 20. The reference to east and west has been utilized as an arbitrary designation since in FIG. 5, next to be described, the abbreviations of east and west will be helpful in the explanation of the subsurface coverage obtained by the foregoing techniques and the manner in which the records may be composited to obtain multiple coverage of the same subsurface segments of reflecting beds.

It is to be observed that in utilizing the two cable trucks 23a and 23b, additional time will be saved and the equipment as a whole may be to a greater degree in continuous operation. While the thumper and recording trucks are in operation, the cable trucks will be interchanging places, as shown. The crew of the truck 23a will complete the laying out of the leading cable section (leading in the sense that it is in the direction of advance along the line 54 of exploration). As soon as it has been laid out as described above, the thumping patterns will have been completed, and the truck will plug in the new section and take off to the opposite end of the spread 24. The crew of truck 23b will then unplug the trailing section of the cable, load it on the truck, and take off to the next advanced position for a section of the cable.

The recording truck 20 and the thumper trucks 21 and 22 will then move to new positions, and a new recording will be initiated, the recording apparatus on truck 20 then being plugged into the midposition of the spread. At this time, all trucks will be in motion, and thus there will be a minimum of delay in getting started on the next thumping patterns for collection of additional seismic data. It takes a bit of time to load a section of the cable onto the cable truck 23b and to place it in the next leading position preparatory to the establishment of a new spread placed westerly from the last one utilized. Yet the arrangement as a whole is such that these last-described operations can be completed in the time required for thumping. Meanwhile, the truck and crew 23a will arrive in position to remove the trailing section from the spread 24 preparatory to the next move of the equipment as a whole.

The line of exploration 54 has on it the designations 1 to 10, each designation representing the eventual location of a source location comprising the selected configuration of impact stations by the two dropping trucks. Thus as illustrated, the seismic sources are at locations 1 and 9 and the recording truck at location 5 with the spread extending between stations 3 and 7. For the next operation, the sources will be at locations 2 and 10, and the spread will have been moved so it will extend between locations 3 and 8. In FIG. 4, the size of the recording truck 20 is greatly exaggerated.

With the above understanding of the invention, the overall procedures may now be readily understood and as appearing in FIG. 5. The line of exploration extends from east to west as indicated by the abbreviations therefor, and there have been illustrated the source locations 1 to 12. It is to be understood that these locations are accurately established in the field and that the impact stations previously described are similarly accurately established by markers on the earth to localize rather precisely the origin of the seismic waves to be detected by the geophones of the spread. For each different operation, the spread has been separately illustrated. Thus, the spread 24 for the first operation appears below the line 54 of exploration for convenience. In the field, all operations take place along the exploration line, and it is assumed the equipment moves from east to west. For convenience, location 1 may be assumed to be a part of prior operations carried out at locations to the right of those illustrated in FIG. 5. Thus, the four-section spread 24 at location 1 has only two sections illustrated and disposed between locations 1 and 3. The thumper truck 21 is located at the thumper pattern at location 5 indicated by the rectangle. Inasmuch as both thumper trucks later cooperate as described above, it will for present purposes be assumed that signals are being recorded only on the tape carried by drum 50 of FIG. 4 and as a result of the dropping of the weight by the truck 21 at thumper location 5.

As a result of the generation of the seismic waves, there will be produced seismic signals covering the subsurface segment 5E. The designation 5E means the segment covered by the geophone spread located to the east of the thumper location forming the source of seismic energy at location 5. Thus, with the spread extending between locations 1 and 4 and the truck 21 at location 6, there will be obtained seismic records for the subsurface segment 6E' Similarly, seismic records will be obtained for subsurface segments 7E and 8E with the truck 21 respectively at locations 7 and 8.

With equipment moving from east to west and in manner described more particularly in connection with FIG. 4, the trailing thumper truck 22 will now be at location 1 and the leading thumper truck will be at location 9. The operations will now be explicity like those described in connection with the arrangement of FIG. 4. Since the spread now extending between locations 3 and 7 will be detecting signals both from the sources located to the east and west of the spread, the spread may appropriately carry the designations 1W–9E. These correspond with the designations given to the subsurface segments 1W and 9E which give rise to the seismic signals detected by the spread. As the trucks 21 and 22 progress westerly and complete their thumping patterns at stations 10–12 for truck 21, and 2–8 for truck 22, additional subsurface coverage will be obtained as indicated by the subsurface segments labeled 2W, 10E; 3W, 11E; 4W, 12E and 5W to 8W inclusive.

Again, to simplify the description, the movement of the truck 21 has not been described beyond location 12, it again being emphasized that the foregoing operations are repeated until the end of a selected exploration line which, in some instances, may run for some miles.

The spacings between the adjacent locations 1–12 may vary with terrain but in any event will correspond with those utilized in reflection seismic exploration, though in some instances they may be somewhat closer together. In this connection, the segment of cable removed from and added to the existing geophone spread can vary. Thus, greater or less multiple coverage can be attained as desired by lengthening or shortening the cable sections located in correlation with the space between locations 1 to 12.

As shown, subsurface section 30a appears as part of more than one segment. For example, it appears as one-half of the segment 6W which overlaps half of the segment 5W and also appears as one-half of the segment 9E which overlaps half of the segment 10E. By thus adding together the seismic signals delineating the overlapping portions of these segments, there may be readily obtained a seismogram representing, by compositing, quadruple coverage of a single segment of a reflecting bed.

As will later be explained, the paths of the seismic energy to these variously designated subsurface beds which provide the quadruple coverage differ. In this manner, noise tends to cancel out, and reflections tend to add cumulatively. The result represents records of enhanced distinctiveness and of a kind easier and more reliable to interpret.

That the foregoing is so will be readily evident from a study of FIGS. 6 and 7. In FIG. 6, the source is at location 6 and the spread extends between locations 8 and 12. Accordingly, the segment 30 is delineated by the ray paths illustrated. With the source at location 10 and the spread between locations 8 and 4, it will be seen that the reflecting segment 31 is delineated; and it will further be seen that segments 30 and 31 have in common the segment 30a. It is clear that the travel paths of the seismic energy materially differ, and thus there will be enhanced the cancellation effects mentioned above. In a similar manner, if there be compared the ray diagrams with the source at locations 5 and 9 and the spread extending respectively between locations 7 and 11 and 7 and 3, the ray paths will again be of different length or of different direction and the cancellation effects will be enhanced, since the same subsurface segments 30a in each case have again been delineated.

The foregoing will be further apparent by the arrangement illustrated in FIG. 7 where there have been illustrated on developed film the several records. More particularly, the film 30A corresponds with the segment 30, while the films 31A–33A respectively bear the seismic records for the segments 31–33. After correction for normal moveout, elevation, and the like as in conventional reflection work, these transparent records, each with its own array of seismograms, are then concurrently moved past a light source to expose and obtain a composited record of the common segment 30a on a photosensitive film 40. It is in this manner that there may be readily obtained by photographic methods the composited quadruple coverage of the segment 30a. In a similar manner, there will be obtained quadruple coverage of the additional segments 61–65 of FIG. 5.

From a consideration of FIGS. 6 and 7, it will be seen that by shortening the length of cable sections added to and taken from the spread and by correspondingly shortening the spacing between the locations 1–12, etc., there will be increased multiple coverage and to any degree as may be desired. Moreover, seismic signals at the recording truck may be recorded in digital form and these values then added together and transformed into new seismograms in manner understood by those skilled in the art.

It will be recalled that the multiple coverage will enhance primary reflection signals while reducing noise signals when the reflection signals travel by way of different paths between the source and the detector. That the present invention provides a method whereby there are obtained multiple signals definitive of a subsurface section all traveling over different paths is demonstrated in FIG. 8 where there has been illustrated the manner in which the spread forms a continuous series of detecting stations between source locations 4 and 10. Each point along the common subsurface segment or section 30a will appear as a separate trace on each of the seismograms by reason of travel of seismic energy by way of paths which differ one from the other. For example, a signal representative of reflection from the point 30b of segment 30a appears four times. The first time is by reason of seismic energy traveling from source point 10 and arriving at a geophone placed immediately to the left of the source point 4. The signal again appears on the next seismogram by reason of energy traveling from source point 9 and arriving at a geophone immediately to the left of source point 5. The appearance on the third seismogram is by reason of seismic energy traveling from source point 5 and arriving at a geophone immediately to the left of source point 9. The appearance of the information definitive of subsurface point 30b appears on a fourth seismogram by reason of travel of seismic energy from source point 6 and arriving at a geophone immediately to the left of source point 8.

An examination of the ray paths illustrated in FIG. 8 immediately will disclose that each of the ray paths is different, and thus the information composited and appearing on the final record 40, FIG. 7, is derived by reason of seismic energy being reflected from a common point and arriving at detectors by way of travel paths of different length. Hence, there is no duplication of travel paths in any of the seismic information being composited. These same conditions will exist for each of the points comprising the subsurface segment 30a. For example, the point 30c would also appear on the various seismograms by reason of travel of seismic energy by way of different paths between the various source points and the detectors. The arrows 60a–60d illustrate the direction of change in the location of ray paths for such successive subsurface points as 30c.

With such understanding of the present invention, it is apparent that there is here presented a method which not only more expeditiously provides seismic information but information which, because of the multiple coverage provided by travel of seismic information by way of paths which differ in length one from the other, has provided a new tool of increased value for use by seismic interpreters for more accurately identifying the character of subsurface formations giving rise to the reflection signals.

With the above illustrations of how the data is to be recorded and with the understanding that in lieu of switch 47, of FIG. 4, there may be applied to each of the recording tapes 50 and 51 identification signals indicating the direction and location of the source of seismic energy, other and different methods of compositing may be utilized. In this connection, the response of each detector station may be separately recorded together with its own identifying signal on the tape. These may be readily provided by conventional mark-generated circuits for applying identifying signals on the tape. By reason of the multiple coverage obtained, the records, such, for example, as for segment 30a, may be rearranged or the seismic data programed to form an expanding spread. The utility of the expanding spread and the manner in which it may be utilized to obtain a velocity log of the subsurface structure below the expanded spread has been set forth at some length in my aforementioned copending application and to which reference is made for a more detailed explanation of the applicable techniques.

Now that there have been explained alternative ways of carrying out my invention, it will be understood that additional modifications will suggest themselves to those skilled in the art and that certain features of the invention may be utilized without other features and that the flexibility afforded by the recording techniques and reproduction of the seismic data in any selected programed order greatly facilitates the production of records useful in delineating the character of subsurface formations and that the acquirement of this data is greatly facilitated.

The following claims have been drafted to be commensurate with the scope of the present invention as above set forth and including the modifications just referred to.

What is claimed is:

1. The method of geophysical exploration involving a sectionalized cable having associated therewith at spaced locations a multiplicity of geophones, comprising
    connecting together a selected number of said sections of said cable to form a spread with said multiplicity of geophones disposed in arrays spaced one from the other to form a series of detector stations on a substantially straight line of exploration,
    connecting said spread of geophones to a recording means,
    dropping a weight from a first thumper truck at a plurality of impact stations at a first source location spaced along said line of exploration a substantial distance from said spread,
    recording seismic waves generated by the dropping of said weight and received at said detector stations,
    after the dropping of said weight at a first of said impact stations, dropping a second weight from a second thumper truck at a first of a pluraliy of impact stations at a second source location spaced along said line of exploration a substantial distance on the opposite side of said spread from said first source location,
    recording the seismic waves as received at said detector stations from the dropping of said second weight, repeating the foregoing operations until said weight shall have been dropped at each of said plurality of impact stations of said source locations,
    upon completion of said dropping of said weights at said impact stations, connecting an additional cable section with associated geophones along said line of exploration with one end contiguous to an end of said spread and disconnecting from the opposite end of said cable a section of like length,
    establishing new source locations respectively spaced from the newly established spread by the same amounts as before, and
    repeating the foregoing steps until traverse of said line of exploration shall have been completed.

2. The method of claim 1 in which the steps of recording include recording said seismic waves detected by said spread and resulting from the dropping of a weight in succession at said plurality of impact stations of one source location on one reproducible medium and recording said seismic waves detected by said spread as a result of the dropping of said weight at said impact stations of said second source location on a separate recording medium, whereby said weights may be alternately dropped with the resultant seismic waves from said two source locations separated by the separate recording thereof on said separate media.

3. The method of claim 1 further including compositing said seismic waves produced by the successive dropping of said weight at said impact stations of each said source location by algebraically adding them in time coincidence to produce a composited seismic trace for each of the several arrays of impact stations at said source locations.

4. The method of claim 3 in which the step of compositing includes algebraically adding together in time coincidence at least those parts of said composited traces representing seismic energy generated at said source locations and detected by said spread in different locations but characterized by their reflection from the same segments of a subsurface reflecting bed.

5. The method of claim 1 in which the steps of recording includes recording said seismic waves detected by said geophones of said spread with respect to time on the same recording medium after the dropping of a weight at an impact station of said first source location and then at an impact station of said second source location until completion of the dropping of said weights at all of said impact stations of said two locations.

6. The method of claim 5 further including compositing in time coincidence all of said seismic waves detected as a result of the dropping of said weight at said impact stations of said first source location and separately compositing in time coincidence the seismic waves resulting from the dropping of said weight at said second source location.

7. The method of geophysical exploration involving a sectionalized cable having associated therewith at spaced locations a multiplicity of geophones, a recording truck having recording means thereon, two cable trucks, and two thumper trucks from each of which a weight may be dropped from a selected height to the earth, comprising
    connecting together a selected number of said sections of said cable to form a spread with said multiplicity of geophones disposed in arrays spaced one from the other to form a series of detector stations on a substantially straight line of exploration,
    connecting said cable and its associated geophones to the recording means carried by said recording truck,
    dropping a weight from a first of said thumper trucks at a first of a plurality of impact stations at a first source location spaced along said line of exploration a substantial distance from said spread,
    recording seismic waves generated by the dropping of said weight and received at said detector stations,
    while said first thumper truck is moving to a second impact station and after the recording of said seismic waves, dropping the weight from said second thumper truck at a first of a plurality of impact stations at a second source location spaced along said line of exploration on the opposite side of said spread from said first source location and by an amount corresponding with said spacing of said first source location,
    recording the seimic waves as received at said detector stations,
    repeating the foregoing operations until said thumper trucks shall have dropped their weights at said plurality of impact stations at said source locations,
    while the aforesaid steps are being performed, distributing an additional cable section with associated geophones along said line of exploration and contiguous to said spread,
    upon completion of said dropping of said weights at said impact stations, connecting said additional cable section to said spread and dispatching said cable truck to the opposite end of said spread,
    concurrently with the completion of said weight dropping at said impact stations, unplugging an opposite trailing section of said sectionalized cable and moving it by said second cable truck for disposition along said line of exploration at the leading end of said spread preparatory to its connection to the contiguous cable section to form a new spread for subsequent dropping of weights, upon completion of said weight dropping at said second-named source location, concurrently moving said recording truck and said thumper trucks to new locations respectively corresponding to positions midway of said sectionalized cable and to new source locations spaced substantial distances from the newly formed spread, and repeating the foregoing steps until traverse of said line of exploration shall have been completed.

8. The method of geophysical exploration involving a sectionalized cable having associated therewith at spaced locations a multiplicity of geophones, a recording truck having recording means thereon, two cable trucks, and two thumper trucks from each of which a weight may be dropped from a selected height to the earth, comprising connecting together a selected number of said sections of said cable to form a spread with said multiplicity of geophones disposed in arrays spaced one from the other to form a series of detector stations on a substantially straight line of exploration, connecting said cable and its associated geophones to the recording means carried by said recording truck, dropping a weight from a first of said thumper trucks at a plurality of impact stations at a first source location spaced along said line of exploration a substantial distance from said spread, recording the seismic waves as received at said detector stations, dropping the weight from said second thumper truck at a plurality of impact stations at a second source location spaced along said line of exploration on the opposite side of said spread from said first source location and by an amount corresponding with said space of said first location, recording the seismic waves as received at said detector stations, while the aforesaid steps are being performed, distributing an additional cable section with associated geophones along said line of exploration and contiguous to said spread, upon completion of said dropping of said weights at said impact stations, connecting said additional cable section to said spread and dispatching said cable truck to the opposite end of said spread, concurrently with the completion of said weight dropping at said impact stations, unplugging an opposite trailing section of said sectionalized cable and moving it by said second cable truck for disposition along said line of exploration at the leading end of said spread preparatory to its connection to the contiguous cable section to form a new spread for subsequent dropping of weights, and upon completion of said weight dropping at said second-named source location concurrently moving said recording truck and at least said second thumper truck to new locations respectively corresponding to positions midway of said sectionalized cable and to a new source location spaced at substantial distance from the newly formed spread.

References Cited by the Examiner

UNITED STATES PATENTS

| 2,283,200 | 5/1942 | Flude | 181—.5 |
| 2,336,053 | 12/1943 | Athey et al. | 181—.5 |
| 2,759,551 | 8/1956 | Carlisle et al. | 181—.5 |
| 2,849,076 | 8/1958 | Kaufman | 181—.5 |
| 2,851,121 | 9/1958 | McCollum | 181—.5 |
| 3,105,568 | 10/1963 | Jolly | 181—.5 |

OTHER REFERENCES

"Geograph," copyright 1956, by McCollum Exploration Co., pp. 24, 32–33 relied upon.

SAMUEL FEINBERG, *Primary Examiner.*

CHESTER L. JUSTUS, *Examiner.*